(12) United States Patent
Chen et al.

(10) Patent No.: US 12,119,511 B2
(45) Date of Patent: Oct. 15, 2024

(54) EXPLOSION-PROOF VALVE, BATTERY PACK, AND APPARATUS

(71) Applicant: CONTEMPORARY AMPEREX TECHNOLOGY (HONG KONG) LIMITED, Hong Kong (CN)

(72) Inventors: Xiaobo Chen, Ningde (CN); Xianda Li, Ningde (CN); Shaoji Wu, Ningde (CN); Ting Li, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 365 days.

(21) Appl. No.: 17/578,343

(22) Filed: Jan. 18, 2022

(65) Prior Publication Data

US 2022/0140432 A1    May 5, 2022

Related U.S. Application Data

(63) Continuation of application No. PCT/CN2020/135950, filed on Dec. 11, 2020.

(30) Foreign Application Priority Data

Feb. 28, 2020 (CN) .......................... 202010128393.X

(51) Int. Cl.
  *H01M 50/342* (2021.01)
  *H01M 10/613* (2014.01)
  (Continued)

(52) U.S. Cl.
  CPC ..... *H01M 50/3425* (2021.01); *H01M 10/613* (2015.04); *H01M 50/209* (2021.01);
  (Continued)

(58) Field of Classification Search
  CPC ........... H01M 50/3425; H01M 50/383; H01M 50/394
  See application file for complete search history.

(56) References Cited

U.S. PATENT DOCUMENTS

| 10,279,292 B2 | 5/2019 | Modena et al. |
| 10,529,969 B2 | 1/2020 | Ogawa et al. |

(Continued)

FOREIGN PATENT DOCUMENTS

| CN | 201342199 Y | 11/2009 |
| CN | 103474599 A | 12/2013 |

(Continued)

OTHER PUBLICATIONS

International Search Report and Written Opinion, PCT/CN2020/135950, Mar. 3, 2021, 9 pgs.

(Continued)

*Primary Examiner* — Jonathan G Jelsma
(74) *Attorney, Agent, or Firm* — Kilpatrick Townsend & Stockton LLP

(57) ABSTRACT

Embodiments of this application provide an explosion-proof valve, a battery pack, and an apparatus. The explosion-proof valve includes a flame arresting member and an air permeable membrane. The flame arresting member is configured to connect to a housing of a battery pack, the air permeable membrane is fastened to the flame arresting member, and the battery pack is capable of exchanging gas with the outside through the flame arresting member and the air permeable membrane in sequence. During use of the explosion-proof valve of this application in the battery pack of this application, when thermal runaway occurs inside the housing of the battery pack, pressure inside the housing is suddenly increased, and as a result, the battery pack releases the pressure through the explosion-proof valve, and high-tem- (Continued)

perature runaway gas impacts and melts the air permeable membrane, forming a smooth air flow channel.

13 Claims, 7 Drawing Sheets

(51) Int. Cl.
  *H01M 50/209* (2021.01)
  *H01M 50/30* (2021.01)
  *H01M 50/383* (2021.01)
(52) U.S. Cl.
  CPC ....... *H01M 50/383* (2021.01); *H01M 50/394* (2021.01); *H01M 2200/20* (2013.01); *H01M 2220/20* (2013.01)

(56) References Cited

U.S. PATENT DOCUMENTS

| | | | |
|---|---|---|---|
| 2016/0346720 A1 | 12/2016 | Modena et al. | |
| 2017/0170439 A1 | 6/2017 | Jarvis et al. | |
| 2018/0097214 A1 | 4/2018 | Ogawa et al. | |
| 2019/0386271 A1 | 12/2019 | Ogawa et al. | |

FOREIGN PATENT DOCUMENTS

| | | | | |
|---|---|---|---|---|
| CN | 203983375 U | | 12/2014 | |
| CN | 105529423 A | | 4/2016 | |
| CN | 205316758 U | | 6/2016 | |
| CN | 106150694 A | | 11/2016 | |
| CN | 106876629 A | | 6/2017 | |
| CN | 207409561 U | | 5/2018 | |
| CN | 207634183 U | | 7/2018 | |
| CN | 208138532 U | * | 11/2018 | |
| CN | 208298910 U | | 12/2018 | |
| CN | 109686896 A | * | 4/2019 | ......... H01M 2/1241 |
| CN | 109920953 A | | 6/2019 | |
| CN | 209434272 U | * | 9/2019 | |
| CN | 110311079 A | | 10/2019 | |
| CN | 210467959 U | * | 5/2020 | |
| DE | 102012022346 A1 | | 5/2014 | |
| JP | 2009070628 A | | 9/2014 | |
| JP | 2014165026 A | | 9/2014 | |
| JP | 2020077507 A | | 5/2020 | |
| KR | 1020020041636 A | | 6/2002 | |
| WO | WO2015125163 A1 | | 8/2015 | |
| WO | WO2017059419 A1 | | 4/2017 | |
| WO | WO2017181283 A1 | | 10/2017 | |
| WO | WO-2020220486 A1 | * | 11/2020 | |

OTHER PUBLICATIONS

Ningder Age New Energy Technology Co. Ltd., First Office Action, CN202010128393.X, Jun. 9, 2022, 21 pgs.
Contemporary Amperex Technology Co., Limited, Extended European Search Report, CN20921326.3, Aug. 12, 2022, 7 pgs.
Contemporary Amperex Technology Co., Limited, International Search Report and Written Opinion, PCTCN2020135950, Mar. 3, 2021, 13 pgs.
Notice of Reasons for Refusal received in the corresponding Japanese Application 2022-539000, mailed Jul. 24, 2023, 4 pages.
Notice of Preliminary Rejection received in the counterpart Korean Application 10-2022-7020319, mailed on May 31, 2024.

* cited by examiner

EXPLOSION-PROOF VALVE, BATTERY PACK, AND APPARATUS

CROSS-REFERENCE TO RELATED APPLICATIONS

This application is a continuation application of PCT Patent Application No. PCT/CN2020/135950, entitled "EXPLOSION-PROOF VALVE, BATTERY PACK, AND APPARATUS" filed on Dec. 11, 2020, which claims priority to Chinese Patent Application No. 202010128393.X, filed with the State Intellectual Property Office of the People's Republic of China on Feb. 28, 2020, and entitled "EXPLOSION-PROOF VALVE, BATTERY PACK, AND APPARATUS", all of which are incorporated herein by reference in their entirety.

TECHNICAL FIELD

Embodiments of this application relate to the battery field, and in particular, to an explosion-proof valve, a battery pack, and an apparatus.

BACKGROUND

In apparatuses such as electric vehicles that use batteries as power sources, when excited by an external environment, for example, being subjected to mechanical, electrical, or thermal actions, the batteries are at risk of runaway which even results in disastrous accidents such as fires and explosions.

When a battery in a battery pack is subjected to thermal runaway, a large amount of energy is released, and a mixture of large amounts of high-temperature runaway gas and particles is generated, accompanied by possible burning flames and/or high-temperature sparks. The runaway brings strong mechanical shock and thermal hazards to the battery pack. For example, the emitted flames and high-temperature sparks rapidly increase the temperature inside the battery pack and cause spontaneous combustion of the battery pack, bringing great safety hazards.

SUMMARY

In view of the shortcomings of the prior art, the objective of this application is to provide an explosion-proof valve, a battery pack, and an apparatus, so as to effectively discharge runaway gas, arrest flames and fires, and decrease temperature.

To achieve the above objectives, according to one aspect, this application provides an explosion-proof valve, including a flame arresting member and an air permeable membrane. The flame arresting member is configured to connect to a housing of a battery pack, the air permeable membrane is fastened to the flame arresting member, and the battery pack is capable of exchanging gas with the outside through the flame arresting member and the air permeable membrane in sequence.

When runaway products pass through the explosion-proof valve, burning flames and high-temperature sparks are extinguished by the flame arresting member, and the high-temperature runaway gas is cooled down by the flame arresting member, and finally, the unburned runaway gas is directly discharged. Therefore, the explosion-proof valve in this application can effectively discharge the runaway gas.

In an embodiment, the flame arresting member includes a flame arrester assembly and a main body. The main body has an inlet end and an outlet end, where the inlet end communicates with an interior of the housing, and the outlet end communicates with the flame arrester assembly. The air permeable membrane is fastened to the flame arrester assembly.

The flame arrester assembly functions to arrest fires and flames and cool down high-temperature runaway gas. First, the air permeable membrane seals the explosion-proof valve to ward off water vapor, and second, the air permeable membrane can effectively balance air pressure inside and outside the battery pack.

In an embodiment, the flame arrester assembly has a first end distant from the main body and a second end disposed near the outlet end of the main body. The air permeable membrane is fastened to the first end. The outlet end of the main body is connected to the second end, and the inlet end of the main body is connected to the housing.

In an embodiment, the explosion-proof valve further includes a first filter structure. The first filter structure is disposed at the inlet end of the main body.

The first filter structure can block most solid particles or melts, thereby filtering out solid particles or melts in the runaway products.

In an embodiment, a flow channel communicating the inlet end and the outlet end is formed inside the main body. The explosion-proof valve further includes a second filter structure, where the second filter structure is disposed inside the flow channel of the main body.

The second filter structure can filter out small solid particles that easily block channels of a flame arresting disk.

In an embodiment, the second filter structure is movably disposed inside the flow channel of the main body. The explosion-proof valve further includes an elastic member, where the elastic member is configured to connect the second filter structure and the flame arrester assembly.

Due to the elastic action of the elastic member, the second filter structure shakes back and forth along the flow channel under the action of a force produced due to the air pressure, thereby shaking off the solid particles adhering to the second filter structure and reducing the possibility that the solid particles block the second filter structure. In addition, the movably disposed second filter structure may be separated from the flow channel of the main body, forming an additional air flow path, thereby effectively improving pressure relief efficiency of the explosion-proof valve.

In an embodiment, the first filter structure and the second filter structure are filter meshes, and the mesh number of the first filter structure is less than the mesh number of the second filter structure.

In an embodiment, the flame arrester assembly includes a flame arresting disk and a flame arresting disk housing. The flame arresting disk is fastened inside the flame arresting disk housing, and the flame arresting disk housing is fastened to the outlet end of the main body.

The flame arresting disk housing may be fastened to the outlet end of the main body through welding, to connect the flame arrester assembly and the main body.

In an embodiment, a plurality of channels are formed on a cross section of the flame arresting disk.

The plurality of channels are formed on the cross section of the flame arresting disk, to extinguish burning flames and high-temperature sparks, and let through the runaway gas after cooling it down.

In an embodiment, the channels of the flame arresting disk are triangular channels or corrugated channels.

The channels of the flame arresting disk are triangular channels or corrugated channels, so that a wall effect of the flame arresting disk can be enhanced, allowing the flame arresting disk to effectively extinguish the burning flames and high-temperature sparks and reduce the temperature of the high-temperature runaway gas.

In an embodiment, the main body is a gradually expanding structure, with a cross-sectional area of the main body gradually increasing from the inlet end to the outlet end.

The main body being a gradually expanding structure can increase a cross-sectional area for gas circulation, to reduce a flow speed of the discharged gas, thereby improving the fire arresting effect of the explosion-proof valve.

In an embodiment, a plurality of heat sinks are disposed on an exterior wall of the main body, and the plurality of heat sinks are alternately disposed on the exterior wall along a circumference of the main body.

The heat sinks can effectively dissipate heat absorbed by the flame arresting member, reducing the adverse effect of the high-temperature caused by the thermal runaway of the battery pack on a surrounding environment, thereby avoiding that the fire arresting effect is degraded because of the excessively high temperature inside the flame arresting member.

In an embodiment, the explosion-proof valve further includes a valve cover. The valve cover is configured to detachably connect to the flame arrester assembly, the valve cover is provided with an air vent, and the air permeable membrane is located between the valve cover and the flame arrester assembly.

The valve cover is detachably connected to the flame arrester assembly through a buckle. When the air pressure in the battery pack reaches a threshold, the valve cover can be opened to release pressure.

To achieve the above objectives, according to another aspect, this application provides a battery pack, including the foregoing explosion-proof valve, a housing, and a plurality of battery modules. The plurality of battery modules are accommodated in the housing. The explosion-proof valve is disposed on the housing and communicates with an interior of the housing.

To achieve the above objectives, according to another aspect, this application provides an apparatus, including the foregoing battery pack, where the battery pack is configured to provide electrical energy.

According to the foregoing explosion-proof valve, battery pack, and apparatus, when thermal runaway occurs in the plurality of battery modules of the battery pack, a large amount of energy is released, and runaway products are generated. The runaway products include a mixture of a large amount of high-temperature runaway gas and particles, and emitted flames or accompanying high-temperature sparks. The high-temperature sparks can easily ignite combustible gas, thus rapidly increasing the temperature inside the battery pack. During use of the explosion-proof valve of this application in the battery pack of this application, when thermal runaway occurs inside the housing of the battery pack, pressure inside the housing is suddenly increased, and as a result, the battery pack releases the pressure through the explosion-proof valve, and high-temperature runaway gas impacts and melts the air permeable membrane, forming a smooth air flow channel. When the runaway products pass through the explosion-proof valve, burning flames and high-temperature sparks are extinguished by the flame arresting member, and the high-temperature runaway gas is cooled down by the flame arresting member, and finally, the unburned runaway gas is directly discharged. Therefore, the explosion-proof valve in this application can effectively discharge the runaway gas, arrest flames and fires, and decrease temperature, preventing the battery pack from igniting spontaneously to avoid explosion of the battery pack, and effectively preventing the high-temperature runaway gas from igniting other combustibles or combustible gas outside the explosion-proof valve, to avoid more serious safety problems.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

Figure 1:
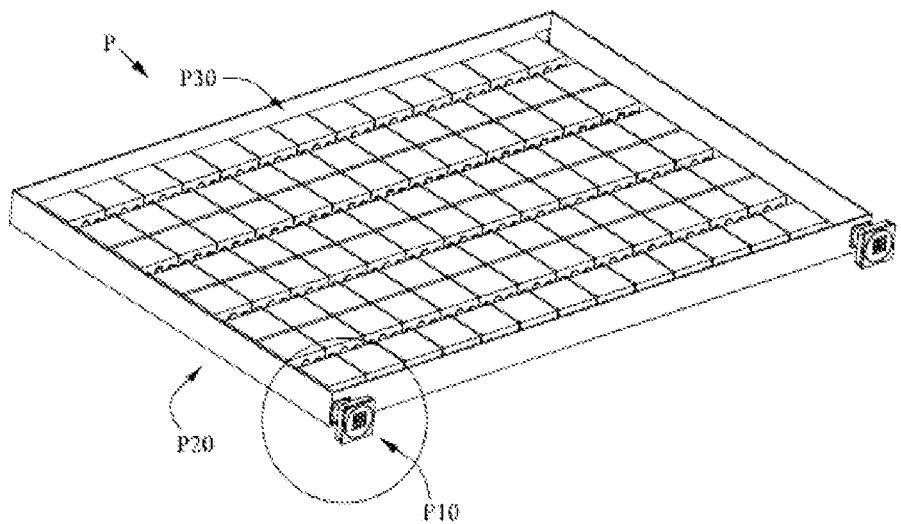
FIG. 1 is a stereoscopic view of a battery pack according to an embodiment of this application.

In the accompanying drawings, the figures are not drawn to scale.

Reference signs are as follows:

| | |
|---|---|
| P. battery pack | 123. flow channel |
| P10. explosion-proof valve | 124. exterior wall |
| 1. flame arresting member | 124a. groove |
| 11. flame arrester assembly | 2. air permeable membrane |
| 111a. first end | 3. first filter structure |
| 111b. second end | 4. second filter structure |
| 112. flame arresting disk | 5. elastic member |
| 112a. channel | 6. heat sink |
| 113. flame arresting disk housing | 7. valve cover |
| 113a. first fastening flange | 71. air vent |
| 113b. second fastening flange | 72. buckle |
| 113c. slot | P20. housing |
| 12. main body | P30. battery module |
| 121. inlet end | T. thickness direction |
| 122. outlet end | |

DESCRIPTION OF EMBODIMENTS

The accompanying drawings show embodiments of this application. It should be understood that the disclosed embodiments are merely examples of this application and this application can be implemented in various forms. Therefore, specific details disclosed herein should not be construed as a limitation. Instead, they should serve only as a basis for the claims and as an illustrative basis to instruct persons of ordinary skill in the art to implement this application in various ways.

In the descriptions of this application, unless otherwise specified and defined explicitly, the terms "first" and "second" are merely intended for a purpose of description, and should not be understood as any indication or implication of relative importance; and the term "plurality of" indicates two or more (including two), unless otherwise specified or defined explicitly. The term "connection" should be understood in its general sense. For example, a "connection" may be a fixed connection, a detachable connection, or an integral connection, or an electrical connection or a signal connection; or may be a direct connection, or an indirect connection through an intermediate medium. A person of ordinary skill in the art can understand specific meanings of these terms in this application as appropriate to specific situations.

In the descriptions of the specification, it should be understood that the positional terms such as "up", "down", "front", and "back" described in the embodiments of this application are described as seen from the angles shown in the accompanying drawings, and should not be understood as limitations on the embodiments of this application.

The orientation terms used in the following description are all directions shown in the drawings, and do not limit the specific structures in this application. In the descriptions of this application, it should also be noted that unless otherwise specified or defined explicitly, the terms "mounted", "interconnected" and "connected" are to be interpreted broadly. For example, they may mean being fixedly connected, or detachably connected, or integrally connected; or may mean being directly connected, or indirectly connected through an intermediate medium. A person of ordinary skill in the art can understand specific meanings of these terms in this application as appropriate to specific situations.

This application is hereinafter further described in detail with reference to the embodiments and accompanying drawings.

An apparatus in this application is an apparatus that uses a battery pack P according to this application as a power source, where the battery pack P is configured to provide electrical energy. The apparatus includes a main body and the battery pack P according to this application, and the battery pack P is disposed in the main body. The apparatus may be a ship, a vehicle, or the like. The vehicle is a new energy vehicle, which may be a battery electric vehicle, or may be a hybrid electric vehicle or an extended-range electric vehicle. A main body of the vehicle is provided with a drive motor. The drive motor is electrically connected to the battery pack P, and receives electrical energy from the battery pack P. The drive motor is connected to wheels of the main body of the vehicle through a transmission mechanism to drive the vehicle. In addition, the battery pack P may alternatively be used in an energy storage cabinet to provide electrical energy.

Figure 2:
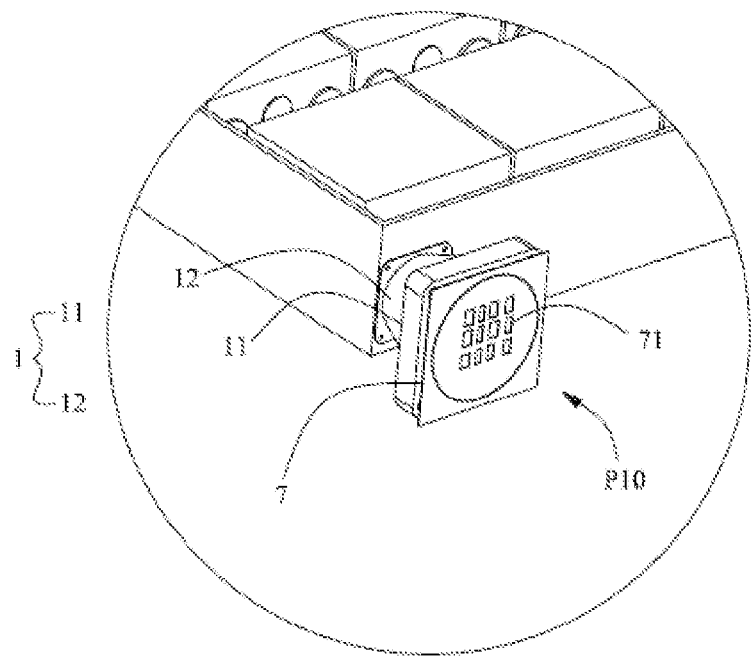
FIG. 2 is an enlarged view of a circled part in FIG. 1.

Referring to the examples shown in FIGS. 1 and 2, the battery pack P according to this application includes an explosion-proof valve P10, a housing P20, and a plurality of battery modules P30 according to this application. The plurality of battery modules P30 are accommodated in the housing P20. The explosion-proof valve P10 according to this application is disposed on the housing P20 and communicates with an interior of the housing P20.

The battery modules P30 are arranged in the housing P20. The battery module P30 includes a plurality of batteries. The battery may be a hard shell battery (or referred to as a can type battery) or a soft package battery (or referred to as a bag type battery). The hard shell battery includes an electrode assembly, a battery housing, a top cover, electrode terminals, an explosion-proof valve, an electrolyte injection hole, and the like. An accommodating cavity is formed inside the battery housing to accommodate the electrode assembly and an electrolyte. The electrode assembly includes a positive electrode plate, a negative electrode plate, and a separator separating the positive electrode plate and the negative electrode plate. The soft package battery includes a packaging bag (for example, made of an aluminum-plastic film), an electrode assembly (similar to the hard shell battery in structure and molding), and tabs.

Referring to the examples shown in FIGS. 1 to 5, the explosion-proof valve P10 according to this application includes a flame arresting member 1 and an air permeable membrane 2. The flame arresting member 1 is configured to connect to the housing P20 of the battery pack P, the air permeable membrane 2 is fastened to the flame arresting member 1, and the battery pack P is capable of exchanging gas with the outside through the flame arresting member 1 and the air permeable membrane 2 in sequence. The air permeable membrane 2 may be fastened to the flame arresting member 1 through welding.

When thermal runaway occurs in the plurality of battery modules P30 of the battery pack P, a large amount of energy is released, and runaway products are produced. The runaway products include a mixture of a large amount of high-temperature runaway gas and solid particles, and emitted flames or accompanying high-temperature sparks. The high-temperature sparks easily ignite combustible gas, rapidly increasing the temperature inside the battery pack P. During use of the explosion-proof valve P10 of this application in the battery pack P of this application, when thermal runaway occurs inside the housing P20 of the battery pack P, pressure inside the housing P20 is suddenly increased, and as a result, the battery pack P releases the pressure through the explosion-proof valve P10, and runaway gas impacts and melts the air permeable membrane 2, forming a smooth air flow channel. When the runaway products pass through the explosion-proof valve P10, burning flames and high-temperature sparks are extinguished by the flame arresting member 1, and the high-temperature runaway gas is cooled down by the flame arresting member 1, and finally, the unburned runaway gas is directly discharged. Therefore, the explosion-proof valve P10 in this application can effectively discharge the runaway gas, arrest flames and fires, and decrease temperature, preventing the battery pack P from igniting spontaneously to avoid explosion of the battery pack P, and effectively preventing the high-temperature runaway gas from igniting other combustibles or combustible gas outside the explosion-proof valve P10 to avoid more serious safety problems.

Referring to FIGS. 2 to 6, in some embodiments, specifically, the flame arresting member 1 includes a flame arrester assembly 11 and a main body 12. The flame arrester assembly 11 has a first end 111a distant from the main body 12 and a second end 111b disposed on the other side of the flame arrester assembly 11 with respective to the first end 111a. The main body 12 has an inlet end 121 and an outlet end 122. The inlet end 121 of the main body 12 communicates with an interior of the housing P20, and the outlet end 122 communicates with the flame arrester assembly 11. The air permeable membrane 2 is fastened to the flame arrester assembly 11. The flame arrester assembly 11 functions to arrest fires and flames and cool down high-temperature runaway gas. The air permeable membrane 2 may be specifically fastened to the first end 111a of the flame arrester assembly 11. The air permeable membrane 2 is not particularly limited to this fastening location. For example, the air permeable membrane 2 may alternatively be fastened to the second end 111b of the flame arrester assembly 11. First, the air permeable membrane 2 seals the explosion-proof valve P10 to ward off water vapor, and second, the air permeable membrane 2 can effectively balance air pressure inside and outside the battery pack P.

Figure 3:
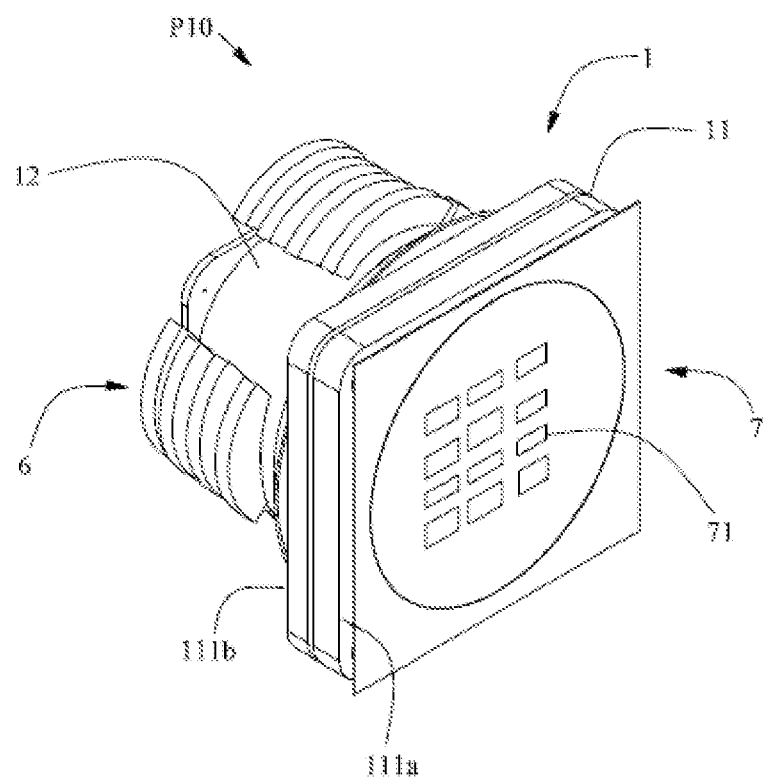
FIG. 3 is a stereoscopic view of an explosion-proof valve according to an embodiment of this application.
Figure 4:
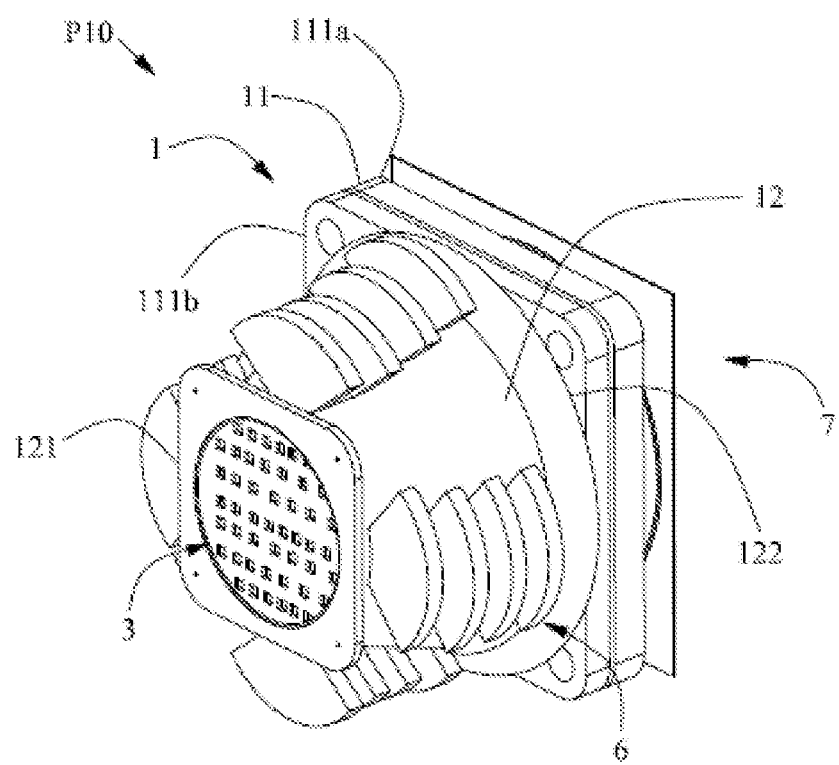
FIG. 4 is a stereoscopic view of the explosion-proof valve in FIG. 3 viewed from another perspective.

The housing P20 is provided with an explosion-proof opening (not shown), and the flame arresting member 1 is connected to the explosion-proof opening to communicate with the interior of the housing P20. The flame arresting member 1 may be connected to the housing P20 through the main body 12. Referring to embodiments shown in FIGS. 2 to 4, specifically, the outlet end 122 of the main body 12 is connected to the second end 111b of the flame arrester assembly 11, and the inlet end 121 of the main body 12 is connected to the housing P20. The main body 12 and the housing P20 are not limited to such connection. Alternatively, the outlet end 122 of the main body 12 may be connected to the housing P20. Certainly, further alternatively, any part between the inlet end 121 and the outlet end 122 may be connected to the housing P20. In addition, the flame arresting member 1 may alternatively be connected to the housing P20 through the flame arrester assembly 11, where the first end 111a of the flame arrester assembly 11 may be connected to the housing P20, or the second end 111b of the flame arrester assembly 11 may be connected to the housing P20, or any part between the first end 111a and the second end 111b may be connected to the housing P20. In other words, the connection between the flame arresting member 1 and the housing P20 is not limited in location. Moreover, the connection between the flame arresting member 1 and the housing P20 is not limited in manner, either. For example, the flame arresting member 1 and the housing P20 may be connected in a non-detachable connection manner such as welding. For convenience of assembly and disassembly, the flame arresting member 1 may alternatively be connected to the housing P20 in a detachable connection manner such as threaded connection. As shown in FIGS. 2 to 4, in some embodiments, the main body 12 is connected to the housing P20, the inlet end 121 of the main body 12 is the same as the explosion-proof opening of the housing P20 in specifications, and the inlet end 121 of the main body 12 is connected to the explosion-proof opening through welding. However, the connection manner is not limited thereto, provided that a sealed connection is ensured. The outlet end 122 of the main body 12 is connected to the second end 111b of the flame arrester assembly 11. The outlet end 122 of the main body 12 is the same as the second end 111b of the flame arrester assembly 11 in specifications, and the outlet end 122 of the main body 12 is connected to the second end 111b of the flame arrester assembly 11 through welding. However, the connection manner is not limited thereto, provided that a sealed connection is ensured.

Figure 5:
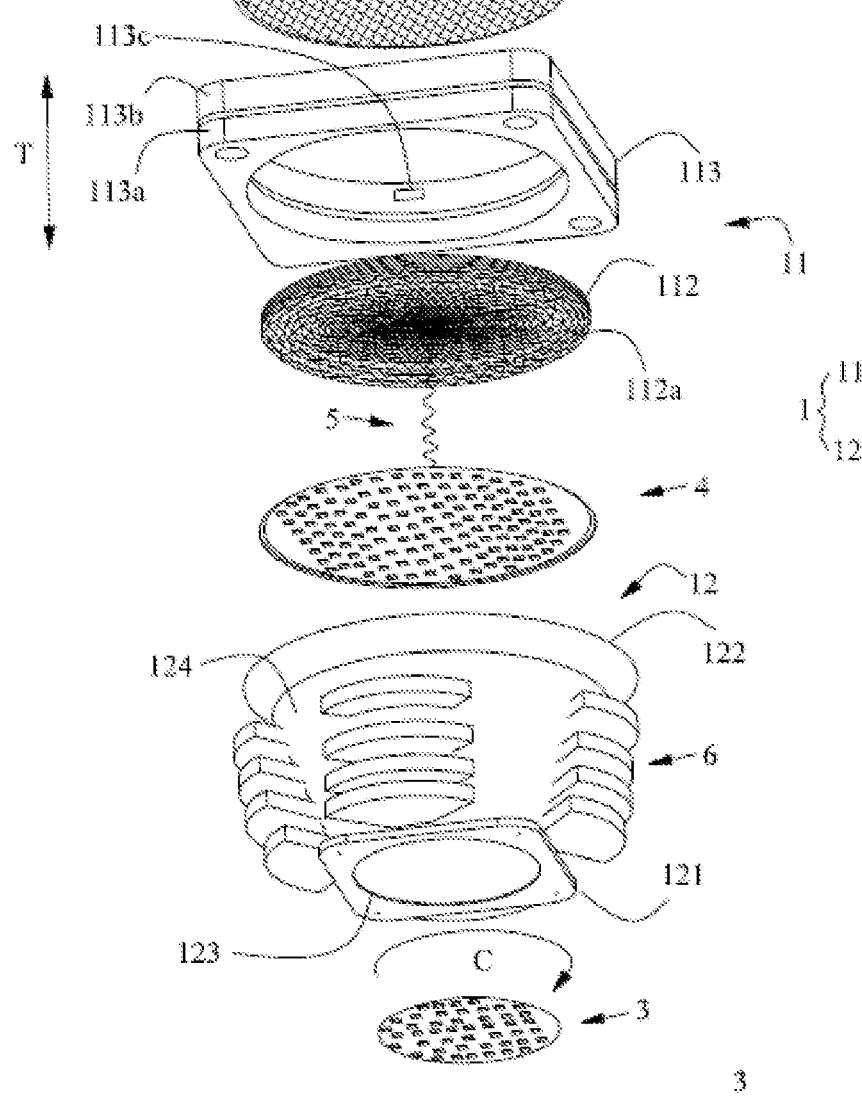
FIG. 5 is an exploded stereoscopic view of an explosion-proof valve according to an embodiment of this application.
Figure 6:
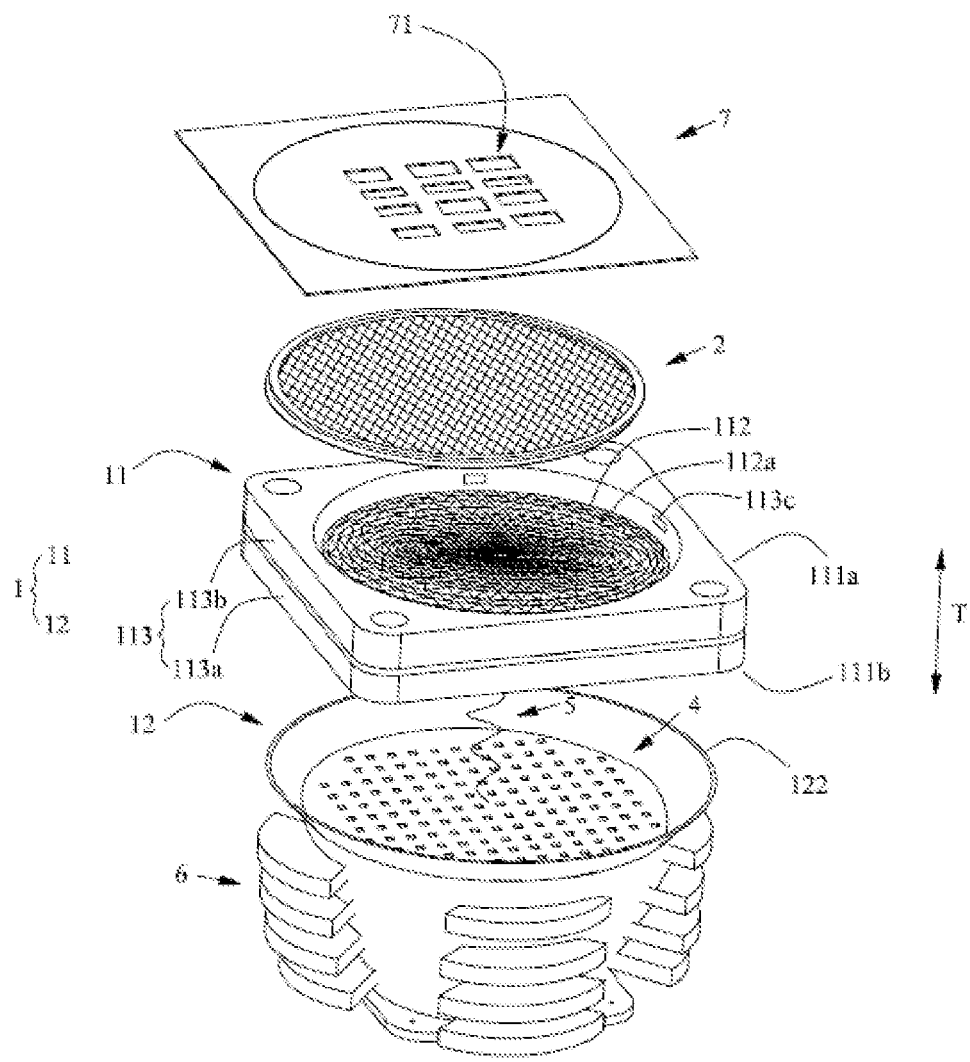
FIG. 6 is a partial exploded stereoscopic view of an explosion-proof valve according to an embodiment of this application.

As shown in FIGS. 5 and 6, in some embodiments, specifically, the flame arrester assembly 11 includes a flame arresting disk 112 and a flame arresting disk housing 113. The flame arresting disk 112 is fastened inside the flame arresting disk housing 113. The flame arresting disk housing 113 is fastened to the outlet end 122 of the main body 12. The flame arresting disk housing 113 may be fastened to the outlet end 122 of the main body 12 through welding, to connect the flame arrester assembly 11 and the main body 12. However, the fastening manner is not limited thereto, provided that sealing and fastening are ensured.

Figure 7:
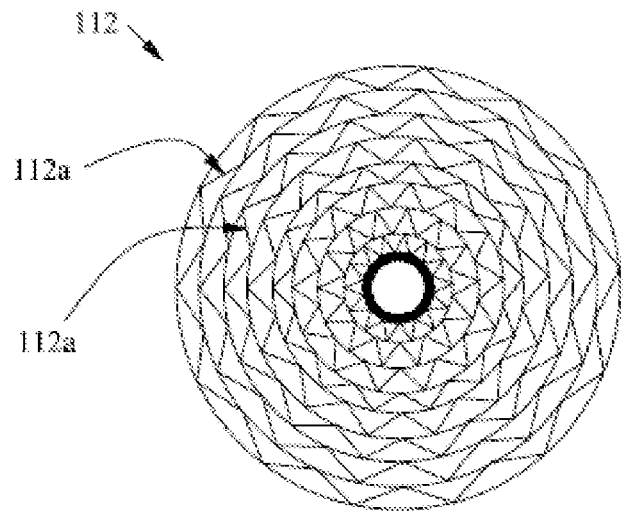
FIG. 7 is a schematic diagram of a flame arresting disk of a flame arrester assembly of an explosion-proof valve according to an embodiment of this application.
Figure 8:
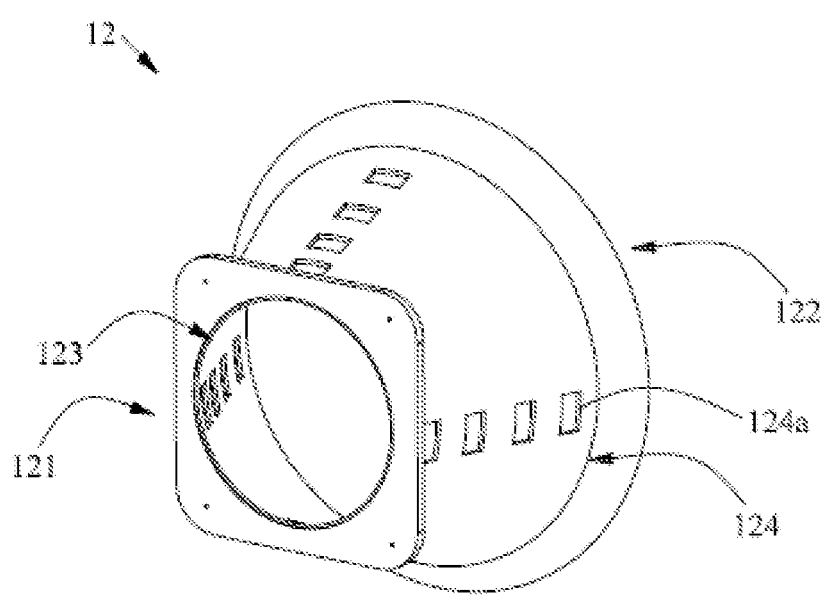
FIG. 8 is a stereoscopic view of a main body of an explosion-proof valve according to an embodiment of this application.
Figure 9:
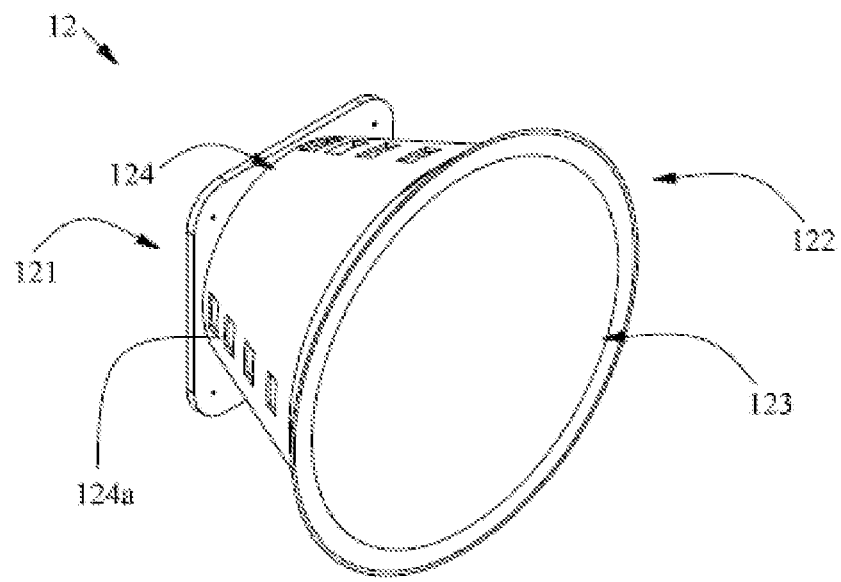
FIG. 9 is a stereoscopic view of a main body of an explosion-proof valve viewed from another perspective according to an embodiment of this application.

Referring to the examples shown in FIGS. 5 to 7, a plurality of channels 112a are formed on a cross section of the flame arresting disk 112, to extinguish burning flames and high-temperature sparks, and let through the runaway gas after cooling it down. Specifically, the channels 112a of the flame arresting disk 112 are triangular channels or corrugated channels, so that a wall effect of the flame arresting disk 112 can be enhanced, allowing the flame arresting disk 112 to effectively extinguish the burning flames and high-temperature sparks and reduce the temperature of the high-temperature runaway gas.

In the embodiment shown in FIG. 7, the flame arresting disk 112 is circular. The channels 112a of the flame arresting disk 112 are triangular channels. For the flame arresting disk 112, a corrugated thin plate material and a flat plate material may be alternately wound around a center axis of the flame arresting disk 112 along radial directions of the flame arresting disk 112 to form a plurality of triangular pores (which are a plurality of channels 112a with a triangular cross section). In this case, the flame arresting disk 112 provides straight flow channels for flames. For the flame arresting disk 112, alternatively, a corrugated plate material may be folded in two directions and then alternately wound around a center axis of the flame arresting disk 112 along radial directions of the flame arresting disk 112 to form a plurality of corrugated pores (which are a plurality of channels 112a with a corrugated cross section). In this case, the flame arresting disk 112 provides zigzag flow channels for flames. The channels 112a of the flame arresting disk 112 are narrow and can function to arrest fires. In addition, the large number of channels 112a means a high porosity and in turn a large volume of gas flow in circulation, ensuring that gas caused by thermal runaway can be smoothly discharged through the explosion-proof valve P10. The flame arresting disk 112 may be made of a wound stainless steel material, for example, a stainless steel sheet, so as to ensure low manufacturing costs in addition to effective functioning of the flame arresting disk 112.

The flame arresting disk housing 113 may be made of a metal material such as stainless steel or aluminum alloy. In the embodiments shown in FIGS. 5 and 6, specifically, the flame arresting disk housing 113 includes a first fastening flange 113a and a second fastening flange 113b. The first fastening flange 113a and the second fastening flange 113b are pressed from two sides of a thickness direction T of the flame arresting disk 112, to fasten the flame arresting disk 112. The first fastening flange 113a and the second fastening flange 113b are fastened together by a bolt, to fasten the flame arresting disk 112, so as to fasten the flame arresting disk 112 and ensure airtightness of the flame arresting disk. It should be noted herein that when the flame arrester assembly 11 is connected to the main body 12, the first fastening flange 113a and the second fastening flange 113b may be fastened to the outlet end 122 of the main body 12 by a bolt.

The flame arresting principle of the flame arresting member 1 includes two points. First, heat transfer. According to the principle that combustion stops when temperature is below an ignition point, after passing through the plurality of small channels 112a of the flame arresting disk 112, a flame turns into a plurality of small flames. The flame arresting disk 112 enlarges a contact area between the small flames and channel walls of the channels 112a as much as possible, thus strengthening heat transfer to bring the flame temperature below the ignition point, thereby preventing the flames from spreading. Second, the wall effect (which is the main mechanism of the flame arresting principle). Combustion and explosion are not direct reactions between molecules, but a result of excitement by external energy, which destroys molecular bonds, and produces activated molecules. These activated molecules are split into active free radicals, and the free radicals collide with other molecules to produce new products. When burning gas passes through the narrow channels 112a, there is an increasing probability that the free radicals collide with the channel walls, so that fewer free radicals will participate in the reaction. When the channels 112a are narrow to an extent, the collision between the free radicals and the channel walls prevails. Due to the sharp decrease in the number of free radicals, the reaction cannot proceed, that is, the combustion reaction cannot continue with the presence of the flame arresting disk 112, thereby arresting the fire and flames and bringing down the temperature.

Referring to FIGS. 5 and 6, in some embodiments, the air permeable membrane 2 may be fastened to the flame arresting disk housing 113. The air permeable membrane 2 may be circular, but is not limited thereto. The air permeable membrane 2 may be made of a waterproof and air permeable polytetrafluoroethylene material, and is configured to maintain a balance between air pressure inside and outside the battery pack P. For ease of fastening the air permeable membrane 2, the air permeable membrane 2 may be fastened in an annular groove with the edges of the air permeable membrane 2 wrapped and fixed. The air permeable membrane 2 is sealed and welded to the flame arresting disk housing 113 through the annular groove.

The main body 12 may be made of a light fire-resistant material with a good heat absorption effect, for example, a stainless steel material. The light fire-resistant material forms a heat absorption layer which can reduce temperature of high-temperature smoke and gas.

As shown in FIGS. 5 and 6 and FIGS. 8 and 9, in some embodiments, the main body 12 is a gradually expanding structure, with a cross-sectional area of the main body 12 gradually increasing from the inlet end 121 to the outlet end 122. The main body 12 being a gradually expanding structure can increase a cross-sectional area for gas circulation, to reduce a flow speed of the discharged gas, thereby improving the fire arresting effect of the explosion-proof valve P10.

As shown in FIGS. 5 and 6 and FIGS. 8 and 9, in some embodiments, the inlet end 121 of the main body 12 is connected to the housing P20, and the outlet end 122 of the main body 12 is connected to the second end 111b of the flame arrester assembly 11. A plurality of heat sinks 6 may be disposed on an exterior wall 124 of the main body 12. The plurality of heat sinks 6 are alternately disposed on the exterior wall 124 along a circumference C of the main body 12. The heat sinks 6 can effectively dissipate heat absorbed by the flame arresting member 1, reducing the adverse effect of the high-temperature caused by the thermal runaway of the battery pack P on a surrounding environment, thereby avoiding that the fire arresting effect is degraded because of the excessively high temperature inside the flame arresting member 1. The heat sinks 6 may be made of a fire resistant material with a good heat transfer effect, for example, a stainless steel material. The heat sink 6 may be a fan in shape to provide good heat dissipation effect. Certainly, the heat sink 6 may be of other shapes. For ease of installation, the heat sink 6 may be fastened, by using a buckle, inside a groove 124a formed in the exterior wall 124.

As shown in FIG. 5, in some embodiments, the explosion-proof valve P10 may further include a first filter structure 3. The first filter structure 3 is disposed at the inlet end 121 of the main body 12. The first filter structure 3 is made of a high-temperature resistant material. The first filter structure 3 may be a filter mesh with a small aperture. The inlet end 121 of the main body 12 is provided with an opening for installing the first filter structure 3. The first filter structure 3 is adapted to the inlet end 121 of the main body 12 in shape and size, and the first filter structure 3 is hermetically installed at the inlet end 121. When thermal runaway occurs in the battery pack P, a large number of high-temperature solid particles or melts will often result, which adhere to the explosion-proof valve P10 after cooling down, possibly blocking the flame arresting member 1 and the air permeable membrane 2. As a result, a large amount of runaway gas in the battery pack P cannot be effectively discharged, and pressure builds up in the battery pack P, which may cause the battery pack P to explode. The first filter structure 3 can block most solid particles or melts, thereby filtering out solid particles or melts in the runaway products.

Figure 10:
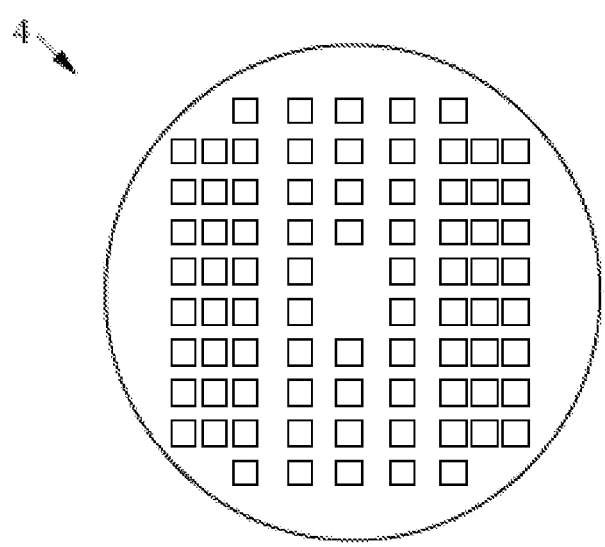
FIG. 10 is a schematic diagram of a second filter mesh of an explosion-proof valve according to an embodiment of this application.

As shown in FIGS. 5 and 6, in some embodiments, a flow channel 123 communicating the inlet end 121 and the outlet end 122 is formed inside the main body 12. The explosion-proof valve P10 may further include a second filter structure 4. The second filter structure 4 is disposed inside the flow channel 123 of the main body 12 to further filter the runaway products, thereby filtering out solid particles or melts missed by the first filter structure 3. This is more conducive to reducing the discharging of solid particles or melts, and avoids blocking the flame arresting member 1 and the air permeable membrane 2. The second filter structure 4 is made of a high-temperature resistant material. The second filter structure 4 may be a filter mesh with a small aperture. Referring to the example shown in FIG. 10, the second filter structure 4 is adapted to the flow channel 123 of the main body 12 in shape and size.

Referring to the examples shown in FIGS. 5 and 6, the first filter structure 3 and the second filter structure 4 may be filter meshes, and the mesh number of the first filter structure 3 is less than the mesh number of the second filter structure 4. In this way, the first filter structure 3 first filters out large solid particles, and then the second filter structure 4 filters out small solid particles that easily block the channel 112a of the flame arresting disk 112. In some embodiments, the mesh number of the first filter structure 3 ranges from 5 to 10. In some embodiments, the mesh number of the second filter structure 4 ranges from 10 to 30.

The second filter structure 4 is movably disposed inside the flow channel 123 of the main body 12. The explosion-proof valve P10 further includes an elastic member 5. The elastic member 5 has elasticity. The elastic member 5 is not limited to a particular shape, provided that it can provide elastic support for the second filter structure 4. The elastic member 5 needs to be high-temperature resistant. The elastic member 5 may be an elastic member such as a spring. The elastic member 5 may be fastened to the center of the flame arresting disk 112 through welding. The elastic member 5 is configured to connect the second filter structure 4 and the flame arrester assembly 11. The second filter structure 4 and the flame arrester assembly 11 are connected through the elastic member 5. When thermal runaway occurs in the battery pack P, high-temperature runaway gas bursts into the flow channel 123, with turbulent air flows. Air pressure applied on the second filter structure 4 is not uniform, and a larger air flow impacts the second filter structure 4. Due to the elastic action of the elastic member 5, the second filter structure 4 shakes back and forth along the flow channel 123 under the action of a force produced due to the air pressure, thereby shaking off the solid particles adhering to the second filter structure 4 and reducing the possibility that the solid particles block the second filter structure 4. In addition, the movably disposed second filter structure 4 may be separated from the flow channel 123 of the main body 12, forming an additional air flow path, thereby effectively improving pressure relief efficiency of the explosion-proof valve P10.

As shown in FIGS. 5 and 6, in some embodiments, the explosion-proof valve P10 may further include a valve cover 7. The valve cover 7 is configured to detachably connect to the flame arrester assembly 11. The valve cover 7 is provided with an air vent 71, and the air permeable membrane 2 is located between the valve cover 7 and the flame arrester assembly 11.

As shown in FIGS. 5 and 6, in some embodiments, the valve cover 7 may be a circular plastic cover to adapt to the flame arrester plate 112 in shape, so as to facilitate installation of the flame arrester assembly 11. The air vent 71 is configured to exchange gas. The air vent 71 may be of any shape. As shown in FIGS. 5 and 6, the air vent 71 is rectangular. Under the condition that the battery pack P works properly, providing the explosion-proof valve P10 can ensure a balance between air pressure inside and outside the battery pack P, and when thermal runaway occurs in the battery pack P and the air pressure reaches a given pressure, the generated runaway gas can blow through the valve cover 7 to be discharged out of the housing P20, forming a smooth air flow channel.

The valve cover 7 may be detachably connected to the flame arrester assembly 11 through a buckle. When the air pressure in the battery pack P reaches a threshold, the valve cover 7 can be opened to release pressure. As shown in FIG. 5, the valve cover 7 is provided with a buckle 72, and the flame arresting disk housing 113 is provided with a slot 113c. The valve cover 7 and the flame arrester assembly 11 are connected through the buckle 72 and the slot 113c. Certainly, the buckle and the slot may alternatively switch their locations.

A sealing member, for example, a sealing ring, may be disposed between the air permeable membrane 2 and the valve cover 7, to seal the explosion-proof valve P10.

In some embodiments, when a battery is subjected to thermal runaway, due to a sudden increase in the air pressure, the runaway gas impacts and melts the air permeable membrane 2 and rushes open the valve cover 7, forming a smooth air flow path. When the generated high-temperature runaway gas and high-temperature solid particles pass through the explosion-proof valve P10, the first filter structure 3 first removes most large solid particles, then the second filter structure 4 further filters out small solid particles, and shaking of the elastic member 5 can shake off solid particles or melts adhered to the second filter structure 4, thereby preventing the solid particles or melts from blocking the air flow path. The burning flames and high-temperature sparks enter the flame arresting member 1 and are removed, and the high-temperature runaway gas is cooled down. Finally, unburned runaway gas is directly discharged, avoiding unexpected spontaneous combustion and ignition of other combustibles inside and outside the battery pack P, thereby ensuring safety of the battery pack P.

The foregoing detailed descriptions describe a plurality of example embodiments. However, this specification is not intended to be limited to the explicitly disclosed combinations. Therefore, unless otherwise stated, various features disclosed herein may be combined together to form a plurality of other combinations that are not shown for simplicity purposes.

The foregoing descriptions are merely optional embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. An explosion-proof valve, comprising a flame arresting member and an air permeable membrane, wherein
   the flame arresting member is configured to connect to a housing of a battery pack, the air permeable membrane is fastened to the flame arresting member, and the battery pack is capable of exchanging gas with the outside through the flame arresting member and the air permeable membrane in sequence; and,
   wherein the flame arresting member comprises a flame arrester assembly and a main body, wherein
   the main body has an inlet end and an outlet end, wherein the inlet end communicates with an interior of the housing, and the outlet end communicates with the flame arrester assembly, and a cross-sectional area of an interior surface of the main body gradually increases from the inlet end to the outlet end; and the air permeable membrane is fastened to the flame arrester assembly.

2. The explosion-proof valve according to claim 1, wherein
   the flame arrester assembly has a first end distal from the outlet of the main body and a second end disposed proximal to the outlet end of the main body;
   the air permeable membrane is fastened to the first end; and
   the outlet end of the main body is connected to the second end, and the inlet end of the main body is connected to the housing.

3. The explosion-proof valve according to claim 2, wherein the explosion-proof valve further comprises a first filter structure, wherein the first filter structure is disposed at the inlet end of the main body.

4. The explosion-proof valve according to claim 3, wherein
   a flow channel communicating the inlet end and the outlet end is formed inside the main body; and
   the explosion-proof valve further comprises a second filter structure, wherein the second filter structure is disposed inside the flow channel of the main body.

5. The explosion-proof valve according to claim 4, wherein
   the second filter structure is movably disposed inside the flow channel of the main body; and
   the explosion-proof valve further comprises an elastic member, wherein the elastic member is configured to connect the second filter structure and the flame arrester assembly.

6. The explosion-proof valve according to claim 5, wherein the first filter structure and the second filter structure are filter meshes, and the mesh number of the first filter structure is less than the mesh number of the second filter structure.

7. The explosion-proof valve according to claim 2, wherein a plurality of heat sinks are disposed on an exterior wall of the main body, and the plurality of heat sinks are alternately disposed on the exterior wall along a circumference of the main body.

8. The explosion-proof valve according to claim 1, wherein the flame arrester assembly comprises a flame arresting disk and a flame arresting disk housing, wherein the flame arresting disk is fastened inside the flame arresting disk housing, and the flame arresting disk housing is fastened to the outlet end of the main body.

9. The explosion-proof valve according to claim 8, wherein a plurality of channels are formed on a cross section of the flame arresting disk.

10. The explosion-proof valve according to claim 9, wherein the channels of the flame arresting disk has a planar surface and has triangular gaps in the planar surface.

11. The explosion-proof valve according to claim 1, wherein the explosion-proof valve further comprises a valve cover, wherein the valve cover is configured to detachably connect to the flame arrester assembly, the valve cover is provided with an air vent, and the air permeable membrane is located between the valve cover and the flame arrester assembly.

12. A battery pack, comprising the explosion-proof valve according to claim 1, a housing, and a plurality of battery modules, wherein the plurality of battery modules are accommodated in the housing; and the explosion-proof valve is disposed on the housing and communicates with an interior of the housing.

13. An apparatus, characterized by comprising the battery pack according to claim 12, wherein the battery pack is configured to provide electrical energy.

* * * * *